United States Patent [19]

McNulty

[11] Patent Number: 4,989,768
[45] Date of Patent: Feb. 5, 1991

[54] REMOVABLE SIDE RACK AND ATTACHMENTS FOR PICKUP TRUCK VEHICLES AND THE LIKE

[76] Inventor: Edward L. McNulty, Rte. 1, Box 524, Midland, Va. 22728

[21] Appl. No.: 518,462

[22] Filed: May 3, 1990

[51] Int. Cl.⁵ .............................. B60R 9/00; B60P 3/00
[52] U.S. Cl. ........................ 224/42.45 R; 224/42.46 R; 224/42.43; 296/3
[58] Field of Search ............... 224/42.32, 42.33, 42.34, 224/42.45 R, 273, 42.46 R, 309, 310, 321–325, 42.38, 42.42 R, 42.43, 329; 296/3; 211/41; 248/214, 215

[56] References Cited

U.S. PATENT DOCUMENTS 4,607,773  8/1986  Mason ........................ 224/42.45 R
4,942,989  7/1990  Miller ........................ 224/42.45 R

*Primary Examiner*—Henry J. Recla
*Assistant Examiner*—David J. Walczak
*Attorney, Agent, or Firm*—Richard C. Litman

[57] ABSTRACT

A temporarily installable, quickly and easily removable rack provides for the carriage of long and/or large sheet materials on the outside of the sidewall of a pickup truck type vehicle or the like. The rack consists of an essentially vertical beam with a shoe which rests upon the upper flange of the vehicle cargo box sidewall. The upper end of the beam is secured by a strut or cable which extends into the cargo box and is attached to the bed of the box immediately adjacent the inner sidewall. The beam has a shoe at the lower end providing for the support of any materials carried thereupon, and provision is also made for a retaining strap for the securing of materials against the beam. Attachment points for the strut or cable may be permanently installed; a temporarily installable attachment point is also disclosed which does not require modification of the vehicle structure. The rack is preferably used in pairs, installed fore and aft along the vehicle cargo box sidewall for the support of the forward and aft ends of any materials carried thereupon, thus leaving the cargo box open for the carriage of other objects. The rack is particularly suitable for use with smaller pickup type vehicles, in which a standard four foot by eight foot sheet of building material will not fit.

5 Claims, 2 Drawing Sheets

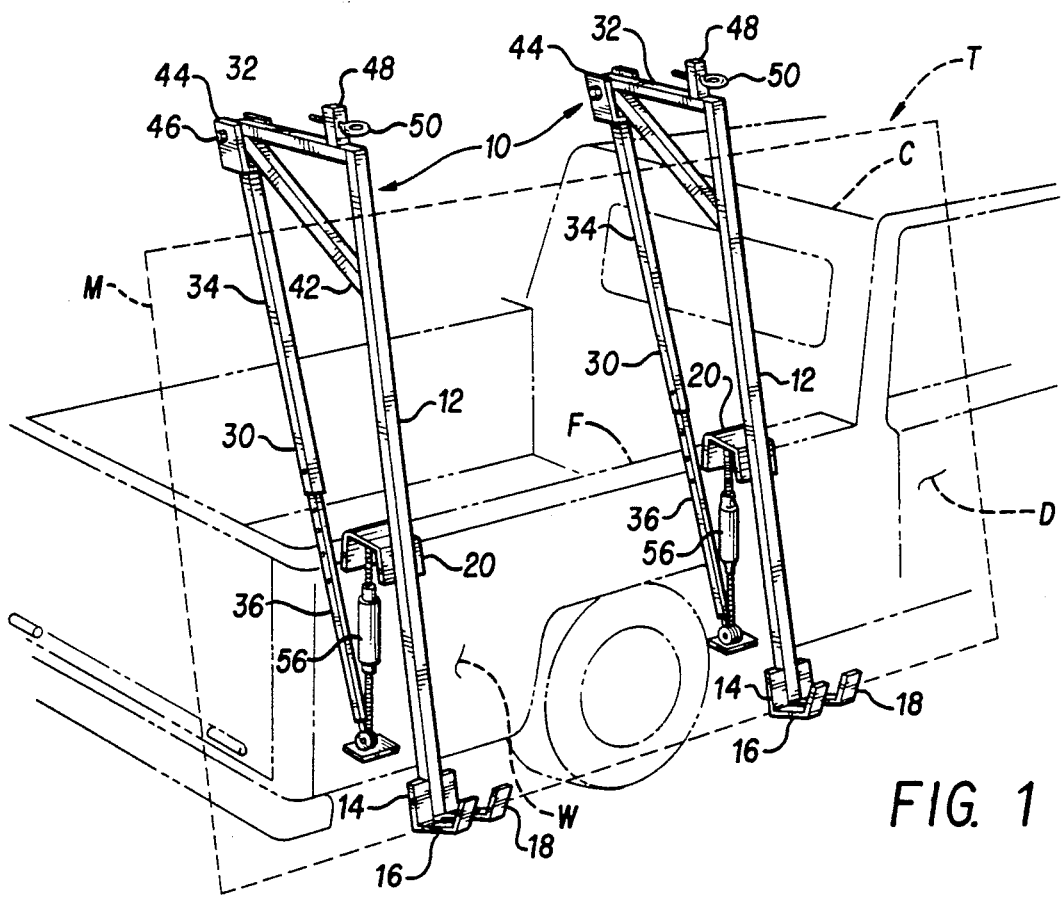
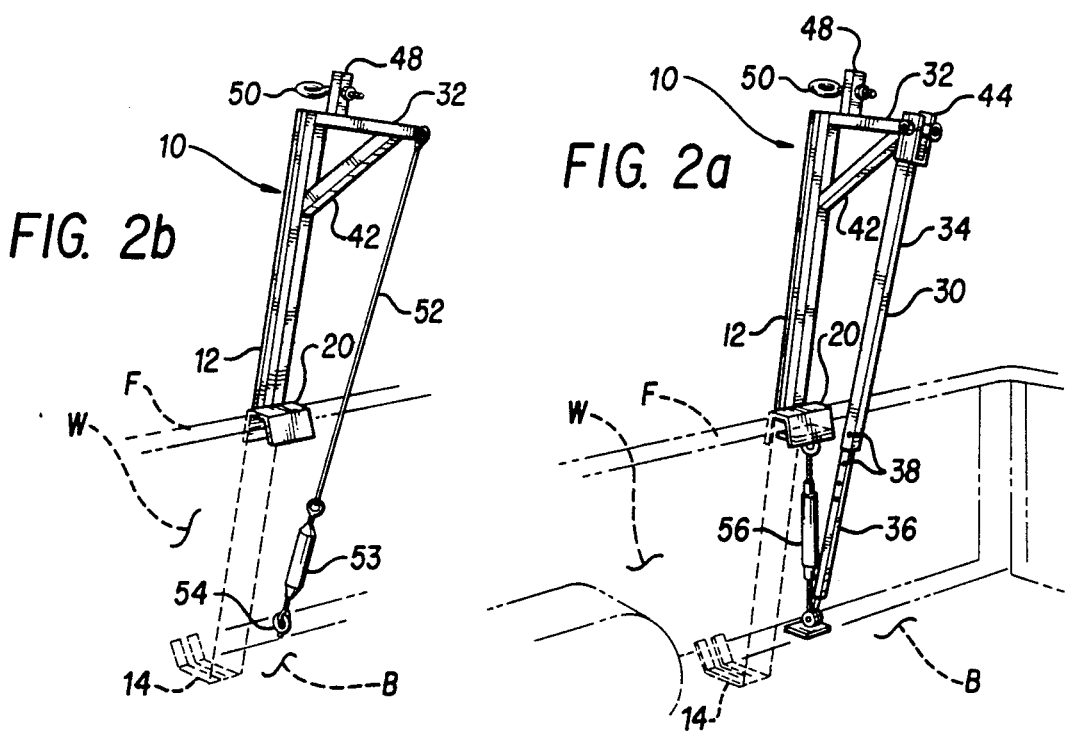

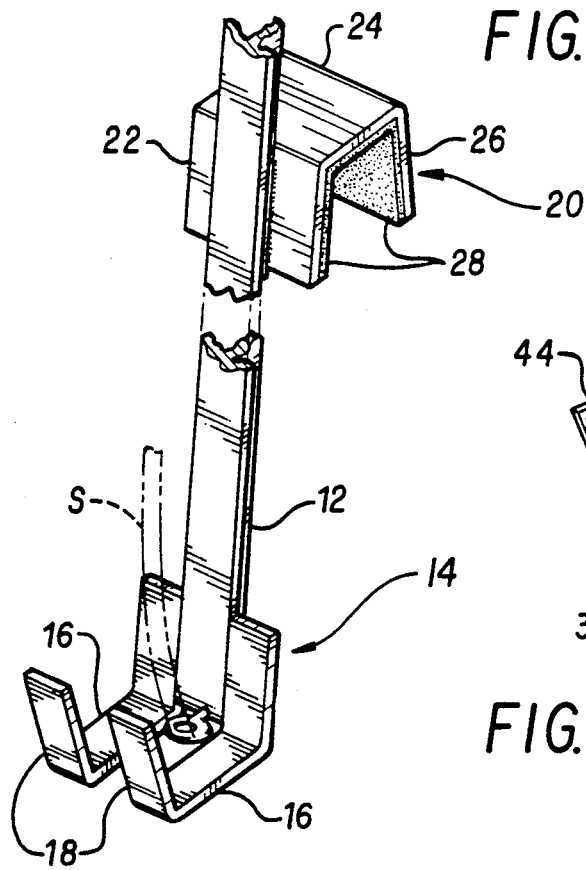
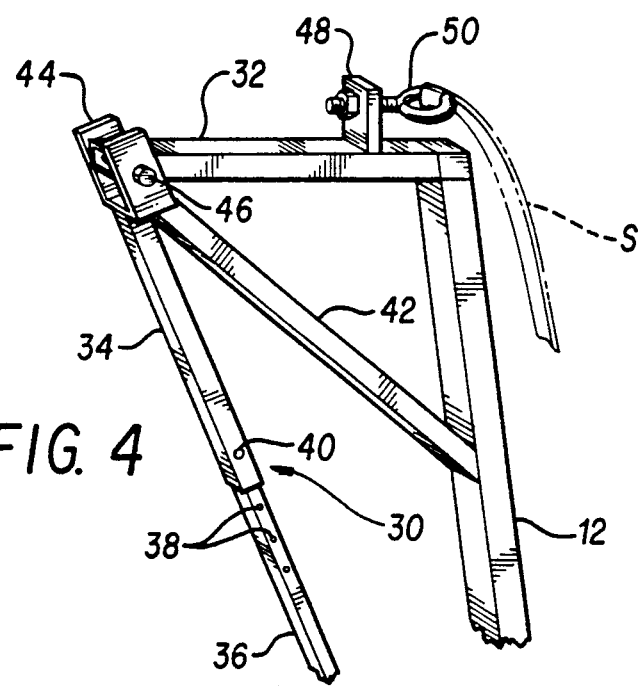
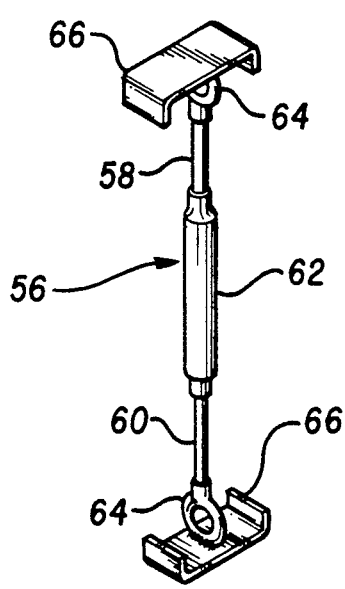

REMOVABLE SIDE RACK AND ATTACHMENTS FOR PICKUP TRUCK VEHICLES AND THE LIKE

FIELD OF THE INVENTION

This invention relates generally to vehicle mounted racks for the carriage of long and/or relatively large sheet materials, and more specifically to a removable rack and attachments therefor which may be temporarily attached to the sidewall of a pickup truck cargo box or the like for the carriage of such materials.

BACKGROUND OF THE INVENTION

In the past, most pickup truck type vehicles possessed a cargo box typically large enough to completely contain a four foot wide by eight foot long ("four by eight") panel of material. This was a prime requirement of many purchasers of pickups, since many of these persons were engaged in the building and construction trade, and the standard size of many sheet products used in the trade is four by eight.

However, with the increase in smaller imported vehicles, including pickups, more strict requirements for fuel economy, higher insurance for larger vehicles, and perhaps other factors, smaller pickups with smaller cargo box dimensions have become popular in the recent past. When such smaller pickups are used for the carriage of standard size building materials, the materials must be placed and/or secured at some other location than completely within the box. While one edge of such material may be placed within the box, the opposite edge will extend beyond the upper edge of the opposite sidewall and be subject to wind gusts or other upsetting forces which may damage the material or possibly cause it to be blown completely from the vehicle cargo box.

Even if such material were secured within the cargo box, a problem arises when it is desired to place additional bulky, heavy and/or non planar material in the box with the sheet material. Even in the case of larger pickups capable of carrying four by eight material completely within the cargo box, the bulky objects must be placed on top of the sheet material in order to achieve the most efficient loading. If it is desired to remove the sheet material first, any other objects atop the sheet material must also be removed and then reloaded.

One alternative is the overhead rack. Such racks are well known and may be fitted to virtually any size pickup type vehicle as well as others. While such overhead racks alleviate the problems associated with cargo boxes smaller than the sheet material to be carried and the carriage of additional objects with such sheet material, such racks are generally of such a size and weight so as to preclude their being quickly and easily removed or installed. They are generally left in place once installed, which results in poorer access to the cargo area and therefore less flexibility for the vehicle, as well as reducing vertical clearance. Moreover, the placement and removal of long and/or sheet material of large dimensions from the overhead rack is relatively awkward, generally requiring two persons, in comparison with the placement or removal of such material from the pickup box which is located at a lower, more accessible level.

The need arises for a rack which may be temporarily affixed to and removed from a pickup truck type vehicle or the like, which is capable of easily carrying relatively long and/or large sheet material of at least four by eight size or larger. The rack must leave the majority of the truck box open for the carriage of other objects, and permit the placement or removal of materials from the rack by a single person without undue effort, as well as permitting the rack itself to be quickly and easily removed from the vehicle by a single person without undue effort and must be capable of being carried within the cargo bed of the vehicle when not installed. The rack and attachments must permit a relatively rigid installation, as well as secure carriage of any materials placed thereon.

DESCRIPTION OF THE RELATED ART

As noted above, various devices are known which meet some of the above needs. None, however, are known which are capable of addressing all of the above conditions. H. Pector et al. U.S. Pat. No. 3,424,487 discloses a removable rack for the carriage of glass panels on a light truck type vehicle. This device gains its rigidity by means of diagonal cross bracing within the rack and is thus a single integral unit of relatively large size and mass. It would be most difficult for a single person to remove or secure such a device to a vehicle. Moreover, no provision is made for the carriage of the glass or material below the upper edge of the cargo box of the vehicle, resulting in a higher center of gravity and greater susceptibility to crosswinds. The device also takes up considerable room within the cargo box, thus requiring that other objects or apparatus, such as scaffolding, be transported in an additional vehicle.

Jackson U.S. Pat. No. 4,278,175 discloses a temporarily attachable rack for carrying glass or like sheet materials on the side of a pickup truck or the like. This rack, however, must be secured to an overhead rack already installed upon the vehicle, the drawbacks of which have already been discussed under Background of the Invention above.

Mays U.S. Pat. No. 4,304,336 discloses an interchangeable rack for the carriage of plate glass or the like. This device is more closely related to the device disclosed in the patent to Pector et al. noted above than to the present invention. The disadvantages are also similar, in that the device is not quickly or easily installable or removable, but must be assembled or disassembled for such installation or removal, and moreover requires a considerable amount of space within the cargo box of the vehicle.

None of the above noted patents, either singly or in combination, are seen to disclose the specific arrangement of concepts disclosed by the present invention.

SUMMARY OF THE INVENTION

By the present invention, an improved apparatus for the carriage of long objects and/or sheet materials of relatively large dimensions on a pickup truck type vehicle or the like is disclosed.

Accordingly, one of the objects of the present invention is to provide an improved rack for the carriage of such materials, the rack being temporarily installable on and quickly and easily removable from such a pickup truck type vehicle or the like.

Another of the objects of the present invention is to provide an improved rack which gains the rigidity necessary for such a function from the bracing and securing of the individual rack elements within and upon the box and sidewalls of such a vehicle rather than from being constructed as a single large structure.

An additional object of the present invention is to provide for an improved rack capable of providing substantially all of the cargo space normally available within the cargo box of a pickup truck type vehicle or the like, while at the same time providing for the carriage of long and/or sheet materials upon the rack.

A further object of the present invention is to provide for a rack capable of carrying materials comprising dimensions larger than those of the vehicle cargo box.

Yet another object of the present invention is to provide for a rack capable of carrying such materials at a relatively low height at the side of the vehicle and providing for ease of placement of materials upon and removal of materials from the rack.

Another of the objects of the present invention is to provide for a rack upon which materials being carried may be securely attached.

Yet another object of the present invention is to provide for a rack which may be contained within the cargo box of a pickup type vehicle or the like when not installed.

Still another of the objects of the present invention is to provide for a rack which does not require the use of any stake pockets which may be provided in the upper side walls of the cargo box of a vehicle.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 1 is a perspective view of the rack assembly as it would be installed on a typical vehicle.

FIG. 2a is a perspective view of the interior of the cargo box of a vehicle, showing the rack and securing methods of FIG. 1.

FIG. 2b is a perspective view of the interior of the cargo box of a vehicle, showing an alternative method of securing the rack.

FIG. 3 is a perspective view showing the detail of the base member and sidewall attachment member of the rack.

FIG. 4 is a perspective view showing the detail of the upper end of the rack and one securing method.

FIG. 5 is a perspective view of a sidewall brace member, which can provide a supplemental attachment point for securing the rack.

Similar reference characters designate corresponding parts throughout the several figures of the drawings.

DESCRIPTION OF THE PREFERRED EMBODIMENT

Referring now to the drawings, particularly FIGS. 1, 2a, and 2b, the present invention will be understood to relate to an improved temporarily installable rack apparatus for pickup truck vehicles and the like, for the external carriage of long and/or large sheet material of dimensions greater than those of the cargo box of the vehicle. Racks 10 are shown as they would be installed in a typical light truck type vehicle T in FIGS. 1, 2a and 2b. Such racks 10 will normally be installed in pairs along the sidewall W of such a truck T. The main beam 12 of rack 10 is preferably formed of a single length of T section material, as shown more clearly in FIG. 3, in order to provide for increased stiffness and greater surface area for support of materials carried; however, other suitable materials and shapes may also be used. Beam 12 is preferably greater than four feet in length in order to allow the carriage of sheet materials M of that width, but of course could be formed to any practical length as required.

A lower shoe 14, more clearly shown in FIG. 3, is secured to the base of main beam 12. Lower shoe 14 is divided into two identical sections which are welded or otherwise securely attached to each side of the base of main beam 12. Essentially horizontal extensions 16 extend outward to form the base of lower shoe 14. Extensions 16 are preferably at least seven inches in length, thus permitting the horizontal carriage of two lengths of "two by four" lumber (3½ inches wide) side by side. Other dimensions may also be used as required. A retainer 18 is formed at the end of each extension 16 in order to prevent materials M from slipping beyond the end of extensions 16.

As noted above, lower shoe 14 is preferably formed in two sections, each section respectively attached to a side of the lower end of beam 12. This bifurcated structure of lower shoe 14 permits the insertion and securing of the end of a cargo strap S between the two portions of lower shoe 14, thus serving to firmly secure carried materials M against main beam 12.

An upper shoe 20 is located at the approximate midpoint of beam 12 in order to provide for attachment to the upper flange F of the sidewall W of a pickup truck T or the like. Upper shoe 20 is welded or otherwise securely attached to the inboard surface of beam 12, and extends inward, or in the opposite direction, to that of lower shoe 14. Upper shoe 20 comprises a side plate 22 attached to beam 12, a generally horizontal plate 24 extending inward from side plate 22, and a downwardly directed retaining edge 26 which prevents upper shoe 20, and thus rack 10, from slipping from the upper flange F of the sidewall W while in use. The surface of upper shoe 20 which would otherwise be in contact with the upper flange F of sidewall W may be lined with a relatively soft, resilient material 28 in order to prevent the marring of the surface of the upper flange F of sidewall W. Upper shoe 20 may be located at any point desired on beam 12, but the attachment point is preferably located so as to allow lower shoe 14 to be relatively close to the ground in order to provide the lowest possible center of gravity and greatest stability in crosswinds for any large sheet material M which may be carried.

Main beam 12 may be firmly braced at any desired position by means of strut 30. Strut 30 extends from the inboard end of arm 32 downward to a point located at the edge of the bed B of the cargo box of truck T, near the base of the sidewall W. Strut 30 comprises an upper section 34 and a lower section 36 which are telescopingly arranged. A series of holes 38 are formed in lower section 6, thus allowing a bolt or pin 40 to be installed through cooperating holes in the two sections 34 and 36 in order to provide for adjustment of length.

An angled brace 42 extends diagonally from a point below the upper end of beam 12 to the inboard end of arm 32, thus adding rigidity to the upper structure of rack 10. The upper end of strut 30 terminates in a generally U shaped fitting 44, the ends of which pass on either side of the inboard end of arm 32. Fitting 44, and thus the upper end of strut 30, may be secured to the inboard end of arm 32 by means of a bolt 46 or the like extending through cooperating holes in the members 32 and 44. In order to provide for the securing of the upper end of any retaining strap S, an essentially vertical extension 48 is attached to the top of the outboard end of arm 32, near its connection with the upper end of beam 12. Extension 48 provides for the placement of a generally horizontal eye bolt 50, and thus for the temporary attachment of any cargo strap S which may be used. Alternatively, extension 48 may be eliminated and the shank of eye bolt 50 may be secured in an essentially vertical plane directly through arm 32. FIG. 4 provides a detailed view of the above components and their relationship.

Strut 30 will normally be in tension rather than compression, although of course a rigid strut may also take some compression loads if such loads are encountered. Normally, however, it has been found that no compression loads are encountered between the inboard end of arm 32 and any securing point in the bed B. Thus, a cable 52 may be used to connect the inboard end of arm 32 and a point in the bed B in order to restrain the rack 10. A turnbuckle 53 or other adjusting means may be installed at any desired location in the length of cable 52 in order to provide for adjustment in the length of cable 52 and therefore the angle of rack 10. Although no tendency for the rack 10 to tip inboard in crosswinds has been found, even while carrying large sheets of material M, such a cable 52 would not be capable of preventing such inward movement of the upper portion of rack 10 and thus the method of locating the upper end of rack 10 by means of strut 30 is preferred.

The lower end of strut 30 or cable 52 may be attached to any secure point near the junction of bed B and sidewall W. One method of providing such a securing point is by means of an eye bolt 54 or the like which may be secured directly through the bed B of the truck T. There are limitations with such a system, however, in that if it is desired to relocate the rack 10 in the truck T, eye bolt 54 must also be removed and relocated. This requires the drilling of an additional hole in the bed B of the truck T. In addition, in many cases it is quite difficult to gain access to the underside of the bed B in order to remove or tighten a restraining nut on the shank of the eye bolt 54. For these reasons, a method of providing a restraining point which is easily relocatable and which does not require the drilling of holes through the structure of the truck T is desirable.

Such a relocatable restraint 56 is shown in FIG. 5. Restraint 56 comprises a device based upon the well known turnbuckle principle, in which left and right hand threaded portions 58 and 60 are threaded into a turnbuckle barrel 62. The outer extremities of threaded portions 58 and 60 are equipped with eyes 64, which are in turn welded or otherwise secured to plates 66. Restraint 56 may be placed between the bed B and the underside of the upper flange F of the sidewall W. By installing restraint 56 in an essentially vertical orientation and adjusting the turnbuckle barrel 62 so as to cause threaded portions 58 and 60 to be extended outward from the barrel 62, the length of the restraint 56 may be adjusted so as to tightly fit between the edge of the bed B and the underside of the overlying upper flange F of sidewall W. The lower end of cable 52 or strut 30 may then be secured to the lower eye 64 of restraint 56 in a manner similar to that of the upper attach point, or any other suitable method.

Generally, the user of rack 10 would likely prefer to use a set of two in order to support the forward and rearward ends of any material M which might be carried. It is conceivable that such materials M may be of such a length so as to extend forward past the door D of the cab C of truck T thus preventing the use of that door D. For this reason, racks 10 will likely generally be installed on the passenger side of truck T in order to allow the driver convenient access to his/her door.

When restraint 56 (or eye bolt 54) has been located as desired and secured, rack 10 may be installed by placing upper shoe 20 upon the upper flange F of the sidewall W directly above restraint 56. The length of strut 30 or cable 54 may be adjusted to provide the proper slight angle from the vertical normally desired for rack 10 and secured to the lower end of restraint 56 or eye bolt 64. Any material M desired may then be placed upon the lower shoe or shoes 14 of rack or racks 10 and secured as desired by means of cargo strap S, which may be extended from the lower end of beam 12 upward around the outboard surfaces of any material M and attached to eye bolt 50. Strap S may then be tightened as desired as is well known in such devices, thus securing material M for transport on the outside of the cargo area of truck T and leaving the bed B of the cargo area of truck T open for the carriage of additional objects. If relatively short materials are to be carried which will not extend sufficiently far forward to block access to the door D of the cab C, a rack or racks 10 may be installed on the sidewall W of the drivers side of truck T in addition to or in lieu of installation on the passenger side.

Rack or racks 10 may be quickly and easily removed for storage or for use on another vehicle when no longer needed for carriage of materials M on a specific truck T. Any materials M carried on rack(s) 10 may be removed by loosening and disconnecting at least one end of strap S, and strut 30 or cable 52 may be disconnected from its lower attachment point at eye bolt 54 or restraint 56. When this has been accomplished, rack 10 may be lifted clear of the upper flange F of the sidewall W of the truck T. Restraint 56 may also be removed by loosening turnbuckle barrel 62 so as to remove the pressure holding restraint 56 in place between the underside of upper flange F and the cargo bed B immediately below. The various components may be stored or installed upon another vehicle as noted above, or may be carried in the bed B of truck T enroute to a storage site or to pick up additional materials M for transport, such as a lumber or building supply yard, and reinstalled at that location for further use.

It is to be understood that the present invention is not limited to the sole embodiment described above, but encompasses any and all embodiments within the scope of the following claims.

I claim:

1. In combination with a vehicle having an open cargo area, said cargo area at least partially defined by at least one vertical side wall, said side wall having an inwardly extending generally horizontal flange at its upper edge;
   a temporarily installable and removable rack for the carriage of long and/or large sheet materials,
   said rack comprising a beam defined by an upper and a lower end,
   said lower end having an essentially horizontal shoe providing for the support of materials carried thereupon and provision for the attachment of a material retaining strap,
   said upper end having an inwardly extending generally horizontal member and provision for the attachment of a material retaining strap, said inwardly extending member having an inboard end,
said inboard end providing for the attachment of a securing member,
said securing member having an upper and a lower end,
said upper end of said securing member attached to said inboard end of said inwardly extending member and extending generally downward from said attachment,
lower securing means,
said lower securing means attached within said cargo area of said vehicle and adjustably attached to said lower end of said securing member, and
an upper shoe,
said upper shoe secured at the approximate midpoint of said beam and providing for the support of said rack upon said flange of said vehicle sidewall.

2. The rack of claim 1 wherein;
said securing member is a cable.

3. The rack of claim 1 wherein;
said securing member is a strut,
said strut comprising an upper component and a lower component telescopingly assembled,
said telescoping components having a plurality of cooperating passages,
said passages providing for the containment of a bolt providing for the adjustment of the length of said strut.

4. The rack of claim 1 wherein;
said lower securing means comprises an eye bolt,
said eye bolt affixed through the bed of said cargo area of said vehicle.

5. The rack of claim 1 wherein:
said lower securing means comprises a turnbuckle,
said turnbuckle having a central barrel and an upper and a lower threaded portion cooperating with said central barrel,
said upper and lower threaded portions having upper and lower extremities terminating in eyes,
said eyes having plates attached opposite the attachment points of said threaded portions, whereby
said turnbuckle may be placed in a generally vertical orientation between the upper surface of said bed and the underside of said flange and adjusted,
thereby urging said plates against said bed and said flange underside in order to provide a temporary fixed point of attachment for said lower end of said securing member.

* * * * *